United States Patent
Takebayashi et al.

(10) Patent No.: US 10,377,046 B2
(45) Date of Patent: Aug. 13, 2019

(54) METHOD OF AUTOMATICALLY CONVEYING OBJECT AND AUTOMATIC OBJECT CONVEYING SYSTEM

(71) Applicant: KAWASAKI JUKOGYO KABUSHIKI KAISHA, Kobe-shi, Hyogo (JP)

(72) Inventors: Jun Takebayashi, Kakogawa (JP); Shuhei Kuraoka, Akashi (JP); Hiroyuki Mizumoto, Kobe (JP); Hideshi Yamane, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 134 days.

(21) Appl. No.: 15/539,912

(22) PCT Filed: Dec. 25, 2014

(86) PCT No.: PCT/JP2014/006477
§ 371 (c)(1),
(2) Date: Jun. 26, 2017

(87) PCT Pub. No.: WO2016/103299
PCT Pub. Date: Jun. 30, 2016

(65) Prior Publication Data
US 2017/0348859 A1  Dec. 7, 2017

(51) Int. Cl.
*B25J 19/00* (2006.01)
*B25J 11/00* (2006.01)
(Continued)

(52) U.S. Cl.
CPC .......... *B25J 19/0008* (2013.01); *B25J 11/00* (2013.01); *B25J 13/02* (2013.01); *B66C 1/28* (2013.01);
(Continued)

(58) Field of Classification Search
CPC ....... B25J 19/0008; G05B 2219/39176; G05B 2219/39194; G05B 2219/40255;
(Continued)

(56) References Cited

U.S. PATENT DOCUMENTS

2006/0259165 A1* 11/2006 Stommen ............. G05B 19/404
 700/71
2009/0134107 A1* 5/2009 Doggett .................. B64G 4/00
 212/239
(Continued)

FOREIGN PATENT DOCUMENTS

EP  3 093 109 A1  11/2016
JP  H05-228871 A  9/1993
(Continued)

OTHER PUBLICATIONS

Mar. 10, 2015 International Search Report issued in International Patent Application No. PCT/JP2014/006477.
(Continued)

*Primary Examiner* — Dale Moyer
(74) *Attorney, Agent, or Firm* — Oliff PLC

(57) ABSTRACT

A method of automatically conveying an object, using a suspending moving device and a robot having an arm configured to hold the object, the suspending moving device including a suspender and a moving mechanism configured to move the suspender, and the suspender including a coupler configured to be coupled to the object and a suspending member configured to suspend the coupler, is provided. The method includes a step for locating the coupler of the suspender at a given first position, a step for locating the object at a given second position, a step for causing the robot to hold the coupler located at the first position and coupling the held coupler to the object located at the second position, and a step for causing the suspending moving device to move, by the moving mechanism, the object coupled to the coupler together with the suspender.

2 Claims, 7 Drawing Sheets

(51) Int. Cl.
  *B25J 13/02* (2006.01)
  *B66C 11/12* (2006.01)
  *B66C 1/28* (2006.01)
  *B66C 1/34* (2006.01)

(52) U.S. Cl.
  CPC ................ *B66C 1/34* (2013.01); *B66C 11/12* (2013.01); *G05B 2219/40255* (2013.01); *G05B 2219/45046* (2013.01)

(58) Field of Classification Search
  CPC ........... G05B 2219/39178; G05B 2219/41114; G05B 2219/45046
  See application file for complete search history.

(56) References Cited

U.S. PATENT DOCUMENTS

| | | | |
|---|---|---|---|
| 2010/0185324 A1* | 7/2010 | Ferrara | B25J 9/1638 700/245 |
| 2011/0054682 A1 | 3/2011 | Miyauchi et al. | |
| 2013/0013109 A1* | 1/2013 | Brudniok | B25J 19/0008 700/254 |
| 2014/0023471 A1 | 1/2014 | Miyauchi et al. | |
| 2016/0325433 A1* | 11/2016 | Hashimoto | B25J 9/1679 |

FOREIGN PATENT DOCUMENTS

| | | |
|---|---|---|
| JP | H07-304585 A | 11/1995 |
| JP | H08-277086 A | 10/1996 |
| JP | H09-1492 A | 1/1997 |
| JP | H09-104585 A | 4/1997 |
| JP | 2002-145575 A | 5/2002 |
| JP | 2007-254071 A | 10/2007 |
| JP | 2011-051048 A | 3/2011 |
| JP | 2011-093690 A | 5/2011 |
| JP | 2011-161615 A | 8/2011 |
| JP | 2011-161616 A | 8/2011 |

OTHER PUBLICATIONS

Jun. 27, 2017 International Preliminary Report on Patentability issued in International Patent Application No. PCT/JP2014/006477.

* cited by examiner

METHOD OF AUTOMATICALLY CONVEYING OBJECT AND AUTOMATIC OBJECT CONVEYING SYSTEM

TECHNICAL FIELD

The present disclosure relates to a method of automatically conveying an object and an automatic object conveying system.

BACKGROUND ART

Conventionally, a method is known in which a heavy-weight workpiece is gripped by a gripper of a balancer, and a robot grips the gripper of the balancer and moves the heavy-weight workpiece on a given conveyance route (e.g., see Patent Document 1).

In this method, a worker guides the gripper of the balancer to the heavy-weight workpiece which is placed at a given position, and makes the gripper to grip the heavy-weight workpiece. Then, the balancer is gripped by a gripper of the robot, and the gripper of the robot is moved to a conveyance position on the conveyance route. Thus, the heavy-weight workpiece is conveyable by the small-volume robot with a simple structure.

REFERENCE DOCUMENT OF CONVENTIONAL ART

Patent Document

[Patent Document 1] JP1997-001492A

DISCLOSURE OF THE DISCLOSURE

Problems to be Solved by the Disclosure

However, in the conventional technology, the worker is necessary to cause the gripper of the balancer to grip the workpiece. That is, in the conventional technology, when the workpiece is conveyed by a collaboration of the balancer and the robot, the workpiece is neither able to be automatically gripped nor conveyed.

Summary of the Disclosure

In order to solve the above problem, according to one aspect of the present disclosure, a method of automatically conveying an object, using a suspending moving device and a robot having an arm configured to hold the object, the suspending moving device including a suspender and a moving mechanism configured to move the suspender, and the suspender including a coupler configured to be coupled to the object and a suspending member configured to suspend the coupler, is provided. The method includes locating the coupler of the suspender at a given first position, locating the object at a given second position, causing the robot to hold the coupler located at the first position and coupling the held coupler to the object located at the second position, and causing the suspending moving device to move, by the moving mechanism, the object coupled to the coupler together with the suspender.

According to this configuration, since the positions of the coupler of the suspender and the object are known, by acquiring the positions of the coupler of the suspender and the object, the robot can hold the coupler and mount it to the object. Thereby, the coupling of the object with the moving mechanism is able to be automated.

An interface configured to be couplable to the coupler may be attached to the object, and the coupling the coupler to the object may include causing the robot to couple the held coupler to the object located at the second position by holding the coupler located at the first position and coupling the held coupler to the interface attached to the object.

According to this configuration, the coupler is able to be coupled to the object, without depending on the shape of the object.

In order to solve the above problem, according to one aspect of the present disclosure, an automatic object conveying system is provided, which includes a suspending moving device including a suspender and a moving mechanism configured to move the suspender, the suspender including a coupler to be coupled to an object and a suspending member configured to suspend the coupler, and a robot having an arm configured to hold the object. The robot holds the coupler located at a given first position, and couples the held coupler to the object located at a given second position, and the suspending moving device is configured to move, by the moving mechanism, the object coupled to the coupler together with the suspender.

According to this configuration, since the positions of the coupler of the suspender and the object are known, by acquiring the positions of the coupler of the suspender and the object, the robot can hold the coupler and mount it to the object. Thereby, the coupling of the object with the moving mechanism is able to be automated.

An interface configured to be couplable to the coupler may be attached to the object, and the robot may be configured to couple the held coupler to the object located at the second position by holding the coupler located at the first position and coupling the held coupler to the interface attached to the object.

According to this configuration, the coupler is able to be coupled to the object, without depending on the shape of the object.

The coupler may include a base part coupled to a tip-end part of the suspending member, a suspension maintaining part attached to the base part and formed in a hook shape having an opening, the suspension maintaining part being configured to hook the interface, a connection maintaining part attached to the base part and held by the arm of the robot, a plurality of pressing parts configured to move between a retracted position and a deployed position that is relatively moved from the retracted position downwardly with respect to the base part, the plurality of pressing parts being provided at mutually different locations when seen in a vertical direction, and a pressing part actuator configured to be controlled by the robot to move the plurality of pressing parts between the retracted position and the deployed position. The interface may include a plurality of fitting parts configured to fit to the plurality of pressing parts located at the deployed position, respectively. The pressing part actuator may locate the pressing parts at the deployed position to regulate a movement of the coupler hooked on the suspension maintaining part toward the opening of the suspension maintaining part.

According to this configuration, by the pressing part actuator locating the pressing parts at the deployed position, the interface is able to be fastened to the coupler, and, further, a relative spatial relationship and posture of the coupler with respect to the object are able to be fixed.

Therefore, a position and posture of the object are able to be determined based on the position and posture of the coupler, and when the position and posture of the object are changed, the position and posture of the coupler are able to be determined based on the position and posture of the object. Thus, a conveying operation of the object is able to be performed efficiently.

The interface may be held between the pressing part located at the deployed position and the suspension maintaining part.

According to this configuration, the relative spatial relationship and posture of the coupler with respect to the object are able to be fixed more reliably.

Effect of the Disclosure

The present disclosure demonstrates such an effect that a coupling of an object and a moving mechanism is automated.

MODE FOR CARRYING OUT THE DISCLOSURE

Figure 1:
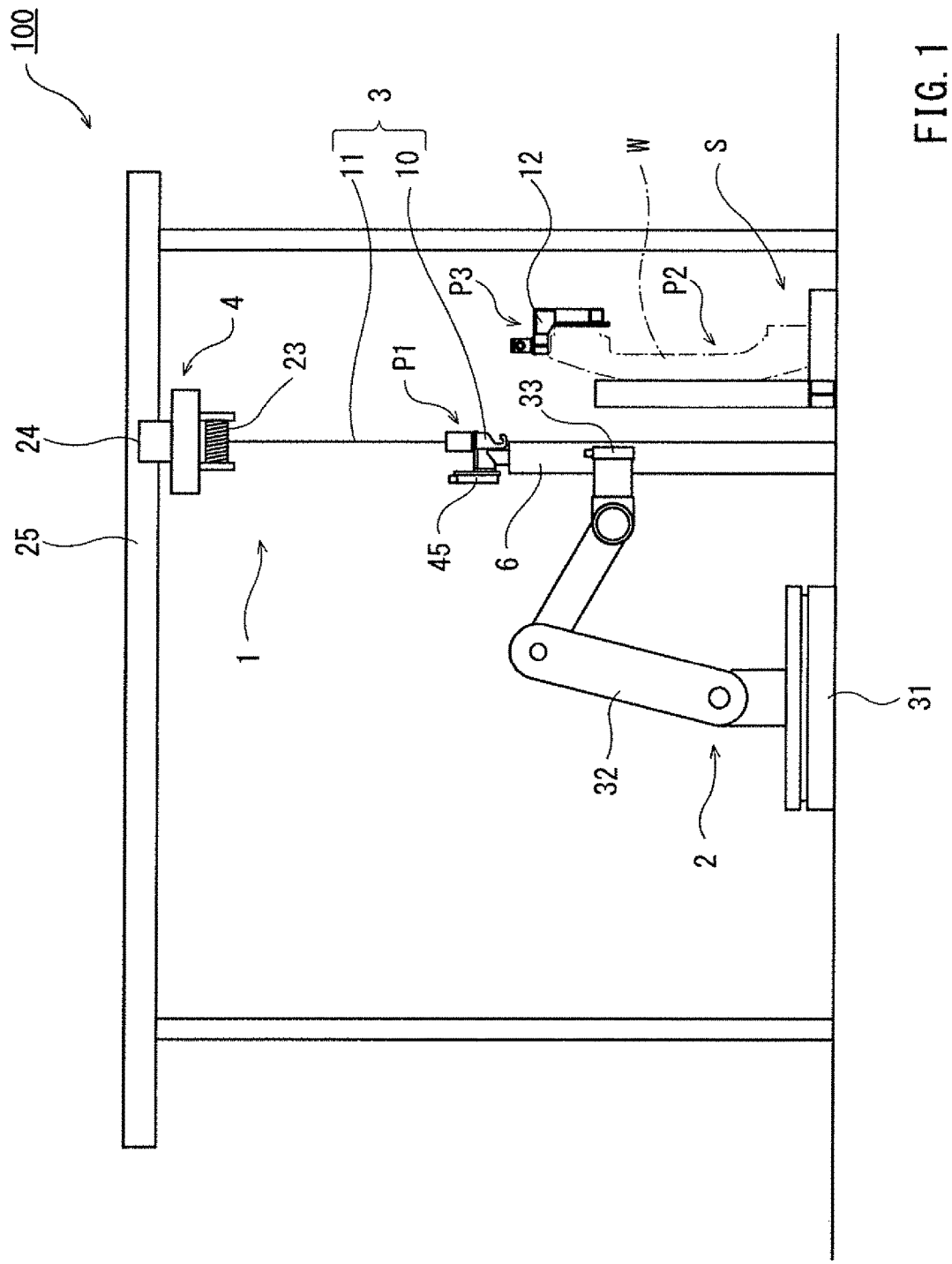
FIG. 1 is a view schematically illustrating one example of a structure of an automatic object conveying system according to one embodiment of the present disclosure.

Circumstances the Inventors Arrived at the Disclosure

A cause of depending on the human hands in the conventional technology is that the robot is not able to recognize the positions of the gripper of the balancer and the heavy-weight workpiece. A recognition device (e.g., camera(s)) for recognizing the positions of the gripper of the balancer and the heavy-weight workpiece may be considered to be provided to the robot; however, the configuration is complicated. Even if the recognition device is provided, since the gripper of the balancer swings, it is difficult to recognize the positions correctly. Therefore, the inventors arrived at the present disclosure.

Hereinafter, one embodiment of the present disclosure is described with reference to the accompanying drawings.

Note that the present disclosure is not limited to this embodiment. Below, through all the figures, the same reference characters are given to the same or equivalent components and, thus, redundant description is omitted.

Embodiment

FIG. 1 is a view schematically illustrating one example of a structure of an automatic object conveying system 100 according to one embodiment of the present disclosure.

The automatic object conveying system 100 is a system which, for example, conveys a workpiece (object) W.

As illustrated in FIG. 1, the automatic object conveying system 100 is installed, for example, in a production line, and is provided with a suspending moving device 1 and a robot 2. The suspending moving device 1 includes a suspender 3 and a moving mechanism 4. An interface 12 is attached to the workpiece W.

In the production line where the automatic object conveying system 100 is installed, a coupler placing table 6 is disposed, for example. The coupler placing table 6 is a table where a coupler 10 (described later) of the suspender 3 is placed. A position at which the coupler 10 of the suspender 3 placed on the coupler placing table 6 is located constitutes a first position P1.

In the production line where the automatic object conveying system 100 is installed, a workpiece yard S is set. The workpiece yard S is a place where the workpiece W is placed. When the workpiece W is placed on the workpiece yard S, a position at which the workpiece W is located constitutes a second position P2. Furthermore, a position at which the interface 12 attached to the workpiece W at this time is located constitutes a third position P3. Thus, since a spatial relationship between the second position P2 and the third position P3 is fixed, it is configured so that one of the positions can be calculated based on the other.

The first position P1 and the third position P3 are set (placed) at mutually distant locations. Both the first position P1 and the third position P3 are set to be located within an operating range (described later) of the robot 2.

[Suspender]

Figure 2:
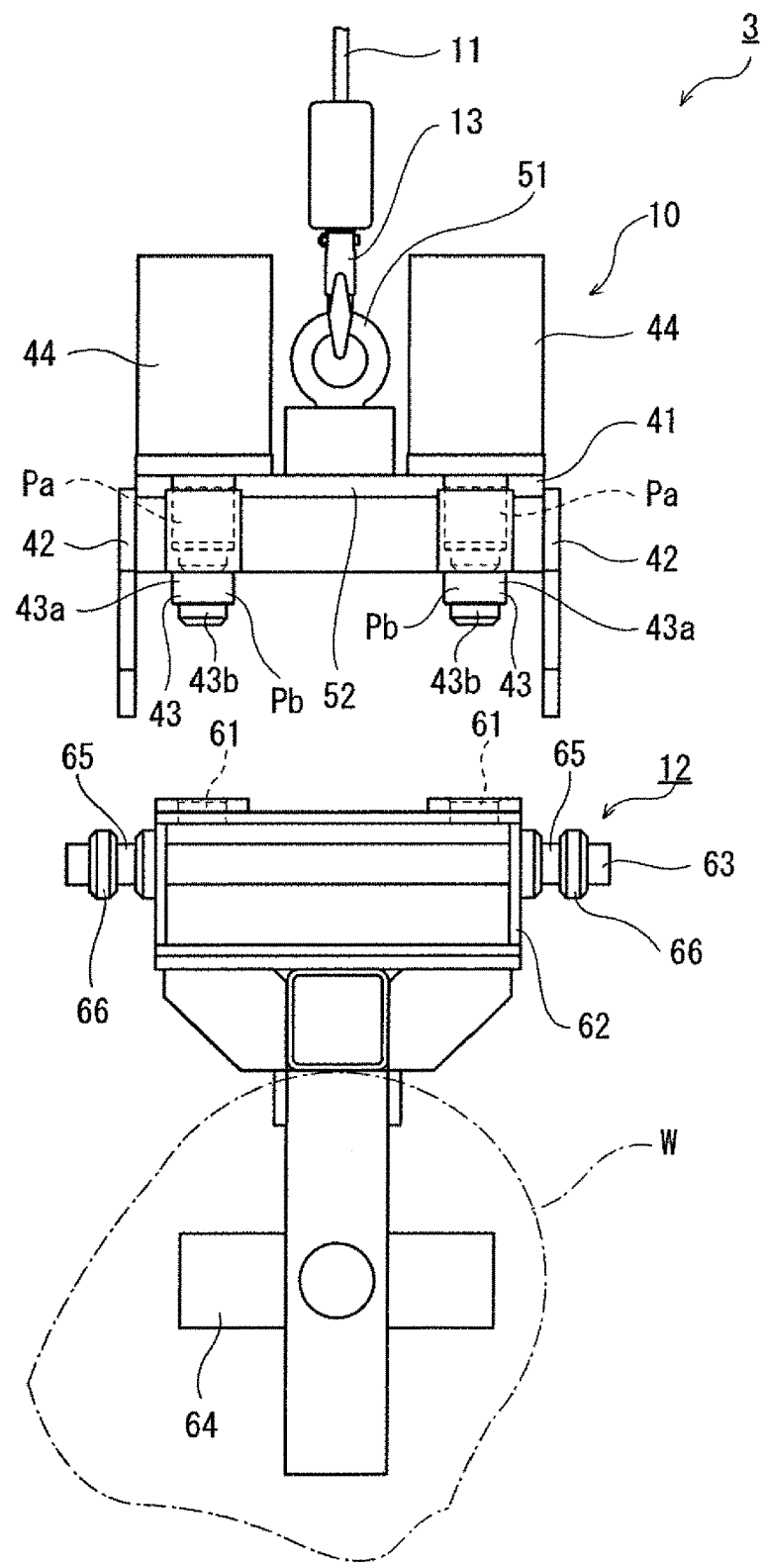
FIG. 2 is a front view illustrating one example of structures of a suspender and an interface of the automatic object conveying system of FIG. 1, and is a view illustrating a state where a coupler of the suspender is detached from the interface.
Figure 3:
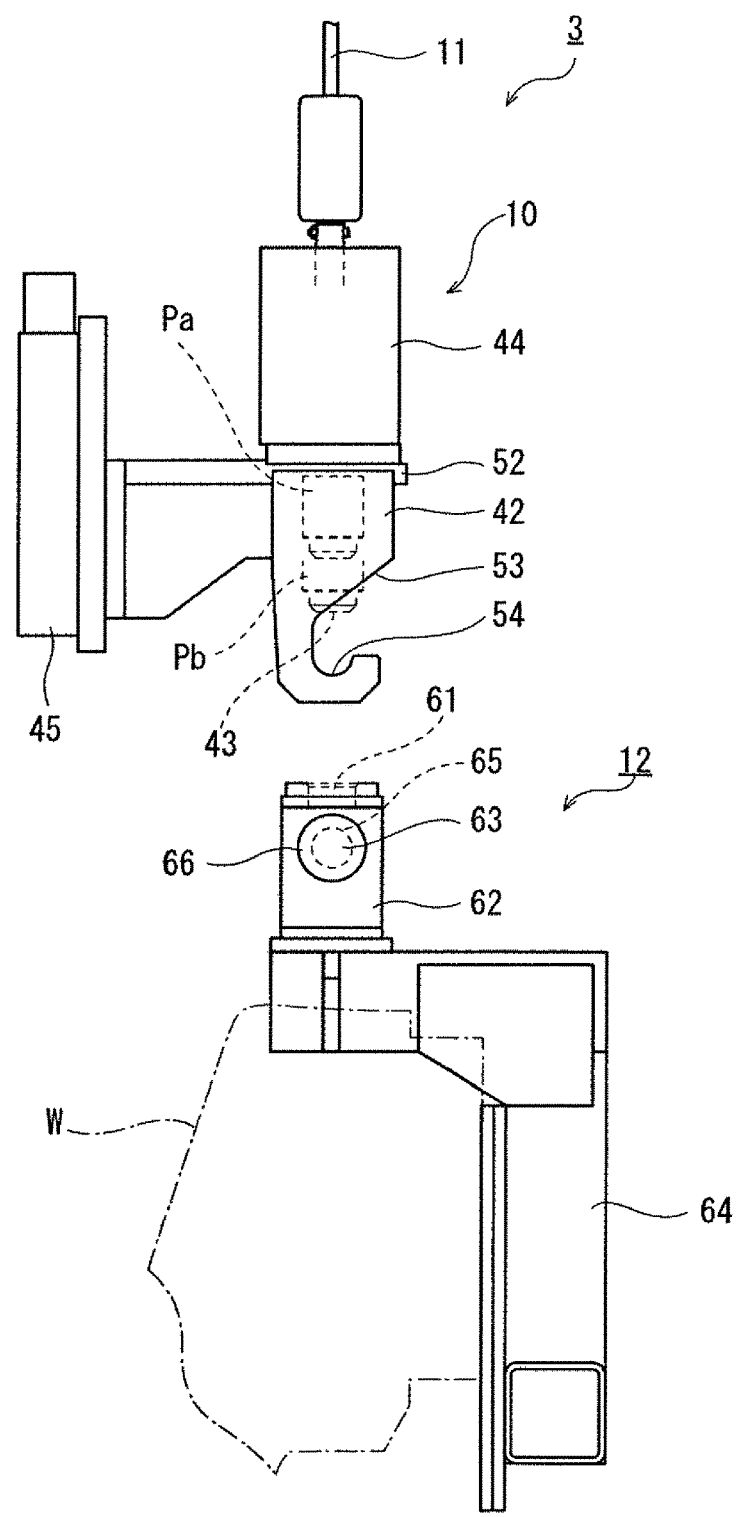
FIG. 3 is a side view illustrating the example of the structures of the suspender and the interface of the automatic object conveying system of FIG. 1, and is a view illustrating the state where the coupler of the suspender is detached from the interface.
Figure 4:
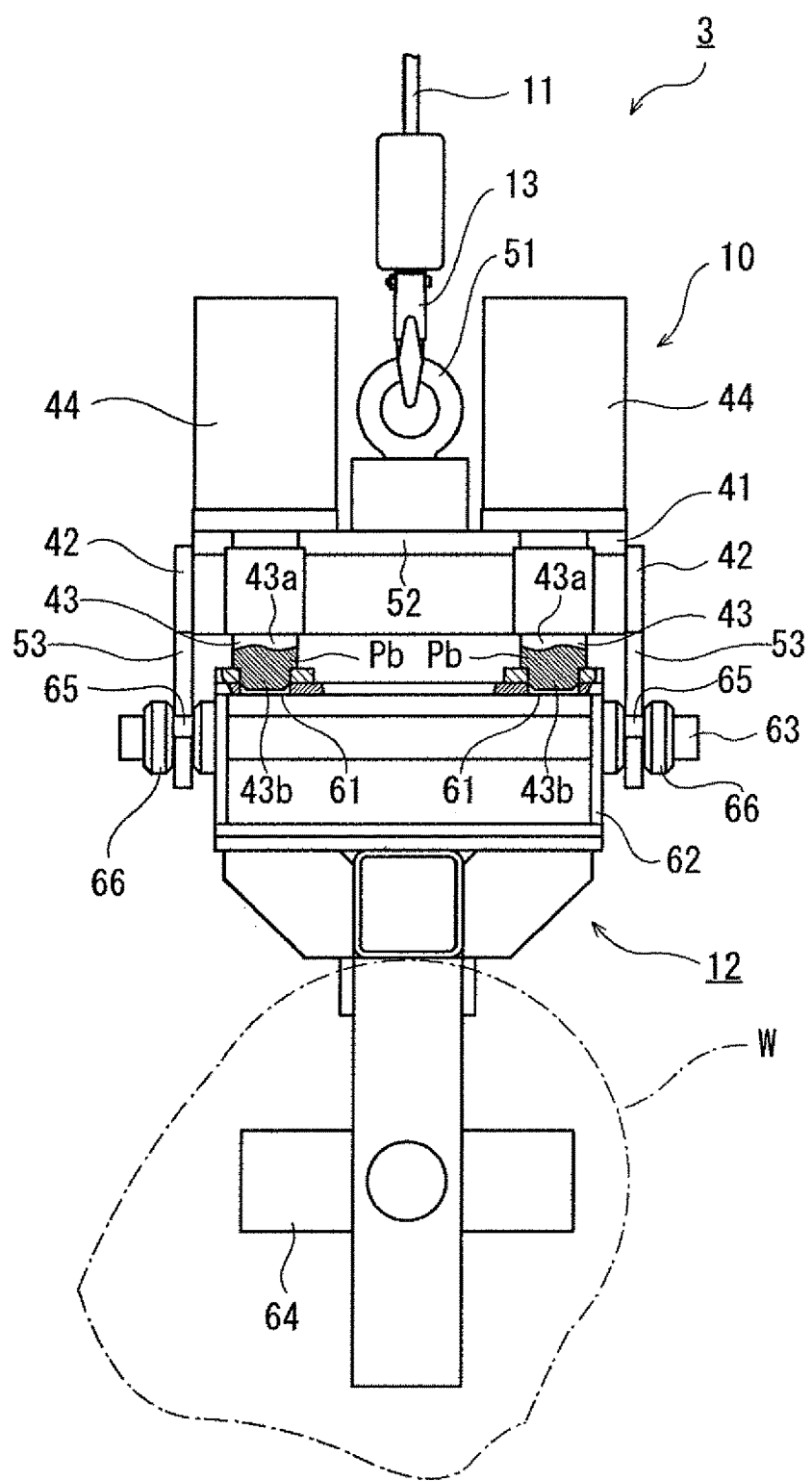
FIG. 4 is a front view illustrating the example of the structures of the suspender and the interface of the automatic object conveying system of FIG. 1, and is a view illustrating a state where the coupler of the suspender is coupled to the interface.
Figure 5:
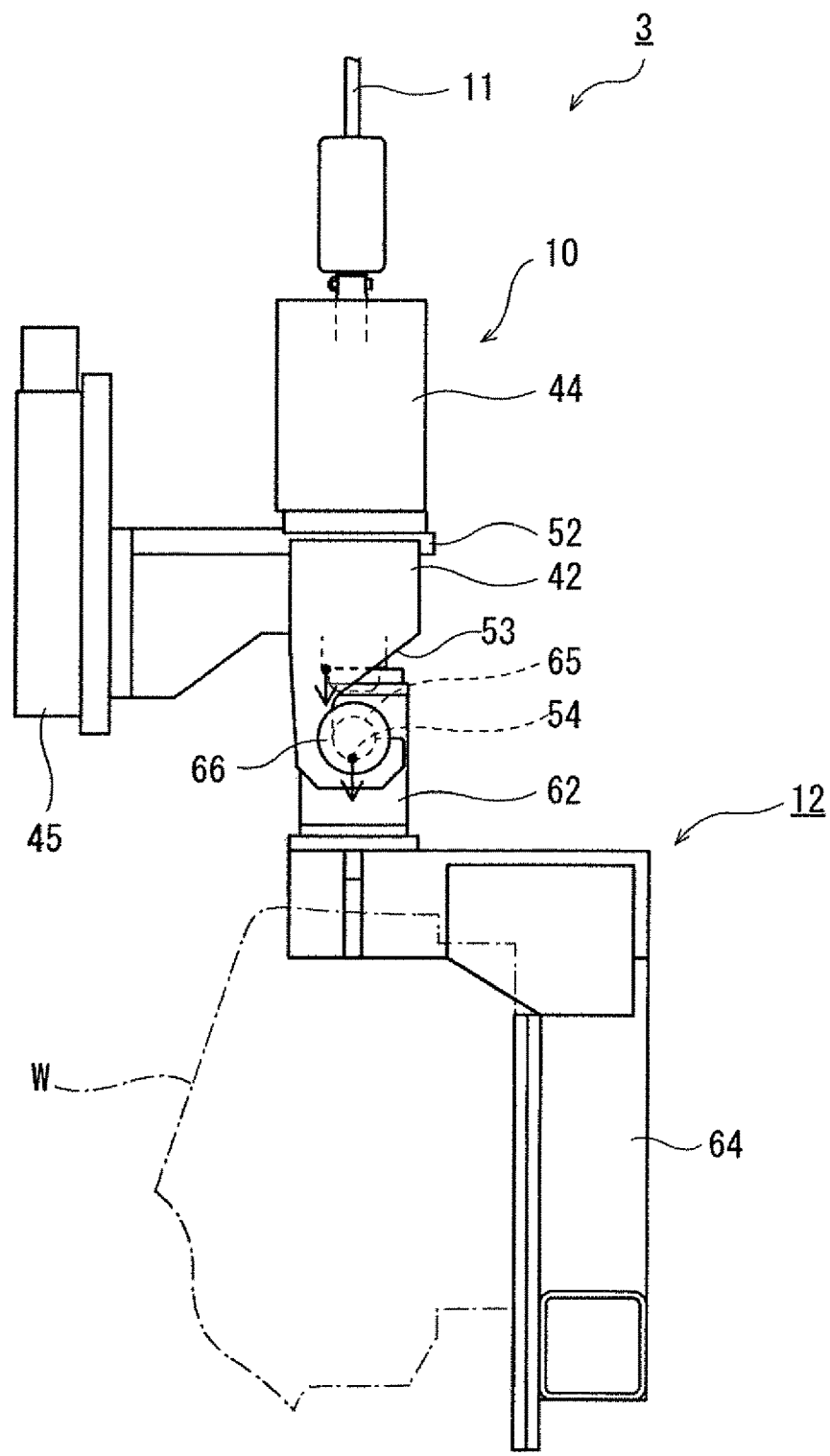
FIG. 5 is a side view illustrating the example of the structures of the suspender and the interface of the automatic object conveying system of FIG. 1, and is a view illustrating the state where the coupler of the suspender is coupled to the interface.

FIG. 2 is a front view illustrating one example of structures of the suspender 3 and the interface 12, and is a view illustrating a state where the coupler 10 of the suspender 3 is detached from the interface 12. FIG. 3 is a side view illustrating the example of the structures of the suspender 3 and the interface 12, and is a view illustrating the state where the coupler 10 of the suspender 3 is detached from the interface 12. FIG. 4 is a front view illustrating the example of the structures of the suspender 3 and the interface 12, and is a view illustrating a state where the coupler 10 of the suspender 3 is coupled to the interface 12. FIG. 5 is a side view illustrating the example of the structure of the suspender 3, and is a view illustrating the state where the coupler 10 of the suspender 3 is coupled to the interface 12.

As illustrated in FIGS. 2 and 3, the suspender 3 includes the coupler 10 and a wire rope (suspending member) 11.

The coupler 10 is to be coupled to (make a junction with) workpiece W, and is to be coupled to the interface 12 attached with the workpiece W. The coupler 10 includes a base part 41, suspension maintaining parts 42, a coupler-side connection maintaining part (connection maintaining part) 45 (see FIG. 3), a plurality of pressing parts 43, and pressing part actuators 44.

The base part 41 includes a coupling ring 51 and a base part main body 52. The coupling ring 51 is a ring body fixed to the base part main body 52. As will be described later, the base part main body 52 places the suspension maintaining parts 42, the coupler-side connection maintaining part 45, the pressing parts 43, and the pressing part actuators 44 to be a given spatial relationship.

The suspension maintaining parts 42 are attached to the base part main body 52 of the base part 41, and are formed in hook shapes having openings 53 (see FIG. 3). The suspension maintaining parts 42 are structured so as to hook coupler attachment parts 65 (described later) of the interface 12.

That is, the suspension maintaining parts 42 are plate bodies extending in a vertical direction, base end parts thereof are fixed to the base part main body 52 of the base part 41, and engaging parts 54 which contact and engage with the coupler attachment parts 65 (described later) of the interface 12 are formed inside the tip-end parts thereof. Side edges of the suspension maintaining parts 42 are notched, and the side edges of the suspension maintaining parts 42 are connected to the engaging parts 54. The notched portion constitutes the openings 53. Thus, as illustrated in FIG. 5, the coupler attachment parts 65 (described later) of the interface 12 are locatable inside the suspension maintaining parts 42 through the openings 53 of the suspension maintaining parts 42, and the coupler attachment parts 65 of the interface 12 are able to contact and engage with the engaging parts 54 of the coupler 10. The engaging parts 54 are formed in shapes corresponding to the bottom surfaces of the coupler attachment parts 65 (described later) of the interface 12 and, thus, fit to the bottom surfaces of the coupler attachment parts 65 of the interface 12. Thus, by engaging the engaging parts 54 with the coupler attachment parts 65 of the interface 12, the mutual spatial relationship is fixed and their positioning is performed. Moreover, the engaging parts 54 are formed in dented shapes, and end parts of the engaging parts 54 on the side where the openings 53 are located, are located above portion thereof near end parts on the opposite side from the end parts of the engaging parts 54 on the side where the openings 53 are located. Thus, the coupler attachment parts 65 (described later) of the interface 12 which engage with the engaging parts 54 are prevented from dislocating from the suspension maintaining parts 42.

As illustrated in FIG. 2, in this embodiment, a pair of suspension maintaining parts 42 are provided, and are arranged horizontally in a state where the coupler 10 is suspended from the wire rope 11. The arranged direction of the pair of suspension maintaining parts 42 constitutes a first direction.

The plurality of pressing parts 43 are structured to move between a retracted position Pa and a deployed position Pb, respectively. The deployed position Pb is a position at which the pressing parts 43 move from the retracted position Pa relatively downward with respect to the base part 41. In this embodiment, the retracted position Pa is set below the base part main body 52 of the base part 41. The plurality of pressing parts 43 are provided at mutually different locations when seen in the vertical direction. In this embodiment, two pressing parts 43 are provided, and these are arranged in the first direction. The pressing part 43 is formed in a cylindrical shape extending in the vertical direction, and has a large diameter part 43a, and a small diameter part 43b which is smaller in the diameter than the large diameter parts 43a, at a tip-end of the large diameter part 43a. A stepped part (not illustrated) is formed between the large diameter part 43a and the small diameter part 43b of the pressing part 43.

The pressing part actuators 44 drive shafts to extend and contract by a control of the robot 2 so that the plurality of pressing parts 43 move between the retracted position Pa and the deployed position Pb. The pressing part actuators 44 are attached to an upper surface of the base part main body 52 of the base part 41, and the drive shafts are inserted into insertion holes (not illustrated) formed in the base part main body 52. The pressing parts 43 are fixed to the drive shafts so that the pressing parts 43 are suspended from the drive shafts of the pressing part actuators 44. In this embodiment, two pressing part actuators 44 are provided corresponding to the pressing parts 43, and these are arranged in the first direction. Since the pressing part actuators 44 are, for example, comprised of well-known air-cylinder devices, detailed description thereof is omitted.

The coupler-side connection maintaining part 45 is attached to the base part main body 52 of the base part 41, and it is structured to be coupled to and released from a robot-arm-side connection maintaining part 33.

The wire rope 11 is to suspend the coupler 10. The wire rope 11 is a wire body, of which a lower end is coupled to the coupling ring 51 of the coupler 10 via a crane hook 13.

[Interface]

The interface 12 is structured so as to be coupled to the coupler 10. The interface 12 is attached to the workpiece W as described above. The interface 12 includes a plurality of fitting parts 61 which fit onto the plurality of pressing parts 43 located at the deployed position Pb, respectively. The interface 12 includes a support frame 62, a holding shaft 63, and a stationary part 64.

The support frame 62 disposes the plurality of fitting parts 61, the holding shaft 63, and the stationary part 64 in a given spatial relationship, as will be described later.

The holding shaft 63 is a cylindrical shaft and extends in the first direction in the state where the coupler 10 is coupled to the interface 12. An intermediate part of the holding shaft 63 is fixed to and supported by the support frame 62. Both end parts of the holding shaft 63 are formed so as to project from the support frame 62. The pair of suspension maintaining parts 42 of the coupler 10 are structured so as to hook one of the end parts of the holding shaft 63 and the other end part, respectively, and these parts constitute the coupler attachment parts 65 of the holding shaft 63. A pair of stop 66 are formed on the holding shaft 63. The stops 66 are a pair of ring bodies which are fitted and attached onto the holding shaft 63. The pair of ring bodies of each stop 66 are disposed in the first direction so as to be spaced apart from each other by a distance corresponding to the thickness of the suspension maintaining part 42. Thus, the stops 66 are structured so as to regulate the movement of the suspension maintaining parts 42 hooked on the coupler attachment parts 65 in the first direction, and position the coupler 10 and the interface 12 in the first direction. Note that inward corners of circumferential edges of the stops 66 (the coupler attachment part 65 side) are chamfered. Thus, when engaging the suspension maintaining parts 42 with the coupler attachment parts 65, the suspension maintaining parts 42 are guidable to the coupler attachment parts 65. The stops 66 may be formed integrally with the holding shaft 63.

As illustrated in FIG. 4, the plurality of fitting parts 61 fit onto the plurality of pressing parts 43 located at the deployed position Pb, respectively. In this embodiment, the fitting parts 61 are holes formed in an upper surface of the support frame 62. An inner circumferential edge of the fitting part 61 is formed in a shape corresponding to an outer circumferential edge of the pressing part 43, and the fitting part 61 is formed to have an inner diameter substantially identical to an outer diameter of the small diameter part 43b of the pressing part 43. Thus, the fitting parts 61 are structured so as to fit onto the small diameter parts 43b of the pressing parts 43 by locating the pressing parts 43 at the deployed position Pb. Therefore, the fitting parts 61 regulate horizontal movements of the pressing parts 43 by fitting the pressing parts 43 into the fitting parts 61.

Moreover, an opening edge (upper edge) of the fitting part 61 is structured so as to contact the stepped part (not illustrated) between the large diameter part 43a and the small diameter part 43b of the pressing part 43 which is located at the deployed position Pb. Thus, by locating the pressing parts 43 at the deployed position Pb, the stepped parts between the large diameter parts 43a and the small diameter parts 43b of the pressing parts 43 press the opening edges of the fitting parts 61 and the upper surface of the support frame 62. Therefore, as illustrated in FIG. 5, in the state where the coupler 10 is coupled to the interface 12, the support frame 62 is biased downwardly and the coupler attachment parts 65 are pressed against the engaging parts 54. Thus, it is configured so that an upward movement of the coupler attachment parts 65 is regulated, and the coupler 10 is fastened to the interface 12.

As illustrated in FIG. 2, two fitting parts 61 are formed corresponding to the pressing parts 43. Thus, since the plurality of fitting parts 61 and pressing parts 43 are formed, it is configured so that a relative rotation between the coupler 10 and the interface 12 in a plane (in a horizontal plane) perpendicular to the extending direction of the pressing parts 43 is regulated by fitting the fitting parts 61 onto the pressing parts 43 and, thus, positioning is performed.

That is, in the state where the coupler 10 engages with the interface 12, the coupler 10 is able to be coupled to the interface 12 by locating the pressing parts 43 at the deployed position Pb and, further, the relative spatial relationship and posture of the coupler 10 with respect to the workpiece W are able to be fixed.

Therefore, a position and posture of the workpiece W to which the interface 12 are attached is able to be determined based on the position and posture of the coupler 10, and when the position and posture of the workpiece W are changed, the position and posture of the coupler 10 are able to be determined based on the position and posture of the workpiece W. Thus, a conveying operation of the workpiece W is able to be performed efficiently.

Since the interface 12 is held between the pressing parts 43 located at the deployed position Pb and the suspension maintaining parts 42, the coupler 10 and the interface 12 are fixed without their relative movement. Thus, the relative spatial relationship and posture of the coupler 10 with respect to the workpiece W are able to be fixed more securely.

The stationary part 64 fixes the workpiece W. The interface 12 is mounted to the workpiece W by fixing the workpiece W to the stationary part 64. Since the interface 12 is attached to the workpiece W, the coupler 10 is able to be coupled to the workpiece W, without depending on the shape of the object.

[Moving Mechanism]

The moving mechanism 4 is to move the suspender 3. The moving mechanism 4 is, for example, an overhead crane provided near the ceiling of a building where the production line is installed. Note that the structure of the moving mechanism 4 is not limited to the overhead crane. Alternatively, the moving mechanism 4 may be a balancer, for example.

In this embodiment, the moving mechanism 4 has a winch 23, a trolley 24, and a traveling rail 25.

The winch 23 includes a drum (not illustrated) around which an upper end portion of the wire rope 11 is wound.

The wire rope 11 is rolled up and drawn by rotating the drum to lift and lower the coupler 10. The winch 23 has an actuator (not illustrated) which drives the drum to rotate. The actuator of the winch 23 is configured so as to be controlled by a robot controller described later.

The winch 23 is attached to the trolley 24, and the trolley 24 is a cart device which translates the winch 23. The trolley 24 is driven to traverse by an actuator provided to the trolley 24 so that the winch 23 moves horizontally. The traveling rail 25 is a rail which supports and guides the trolley 24. The actuator of the trolley 24 is configured to be controlled by the robot controller described later.

Thus, since the actuator of the winch 23 and the actuator of the trolley 24 are configured to be controlled by the robot controller, the workpiece W is able to be conveyed by collaborating the suspending moving device 1 with the robot 2.

[Robot]

As illustrated in FIG. 1, the robot 2 is provided with an arm 32 which holds an object.

In this embodiment, the robot 2 is, for example, an articulated industrial robot. The robot 2 has a robot base 31, the arm 32, the robot-arm-side connection maintaining part 33, an arm actuator (not illustrated), a connection actuator (not illustrated), the robot controller (not illustrated), and a robot memory (not illustrated). The robot controller controls the arm actuator and the connection actuator of the robot 2. Furthermore, the robot controller controls the pressing part actuators 44 of the coupler 10 of the suspender 3. Given control programs are stored in the robot memory, and the robot controller reads and executes the control programs to control the arm actuator and the connection actuator of the robot 2, the actuators of the winch 23 and the trolley 24 of the moving mechanism 4, and the pressing part actuators 44 of the coupler 10. The robot memory also stores the first position P1 and the third position P3.

The robot base 31 is a table which is placed on an installation surface, such as a floor surface of the production line, and supports the arm 32.

For example, the arm 32 includes a plurality of joints, and a base end part thereof is rotatably coupled to the robot base 31. The arm actuator is controlled by the robot controller, and drives the arm 32 so that the robot-arm-side connection maintaining part 33 is located at a given position within an operating range thereof. The robot 2 is disposed so that the first position P1 and the third position P3 is included in the operating range of the robot 2 described above.

The robot-arm-side connection maintaining part 33 is attached to a tip-end part of the arm 32, and is configured to be able to couple to and be released from the coupler-side connection maintaining part 45. The connection actuator is controlled by the robot controller, and drives the robot-arm-side connection maintaining part 33 so that the coupling and releasing of the robot-arm-side connection maintaining part 33 and the coupler-side connection maintaining part 45 are performed. The robot-arm-side connection maintaining part 33, the coupler-side connection maintaining part 45, and the connection actuator are, for example, comprised of a well-known tool changer. That is, in this embodiment, the arm 32 is structured so as to hold the coupler 10 by coupling the robot-arm-side connection maintaining part 33 to the suspending-member-side connection maintaining part 45.

The robot controller controls the pressing part actuators 44 by coupling the robot-arm-side connection maintaining part 33 to the coupler-side connection maintaining part 45.

That is, operation of the pressing part actuators 44 is controlled by the robot controller controlling air which is supplied to the pressing part actuators 44. A channel of the air supplied to the pressing part actuators 44 extends from the robot 2 to the pressing part actuators 44 via the robot-arm-side connection maintaining part 33 and the coupler-side connection maintaining part 45. By coupling the coupler-side connection maintaining part 45 to the robot-arm-side connection maintaining part 33, a channel on the robot 2 side communicates with a channel on the coupler 10 side, which are parts of the channel of the air supplied to the pressing part actuators 44, and the channel becomes in a controllable state of the pressing part actuators 44. On the other hand, the channel is configured so that the channel on the robot 2 side is detached from the channel on the coupler 10 side, which are parts of the channel of the air supplied to the pressing part actuators 44, by releasing the coupler-side connection maintaining part 45 from the robot-arm-side connection maintaining part 33.

The pressing part actuators 44 may be configured so that the position of the drive shaft is fixed by detaching the channel on the robot 2 side from the channel on the coupler 10 side. Thus, even if the robot-arm-side connection maintaining part 33 is detached from the coupler-side connection maintaining part 45, the state where the coupler 10 is coupled to the interface 12 is able to be maintained, and, for example, the robot 2 is able to hold another part of the workpiece W and convey the workpiece W.

[Example of Operation]

Next, one example of operation of the automatic object conveying system 100 is described.

Figure 6:
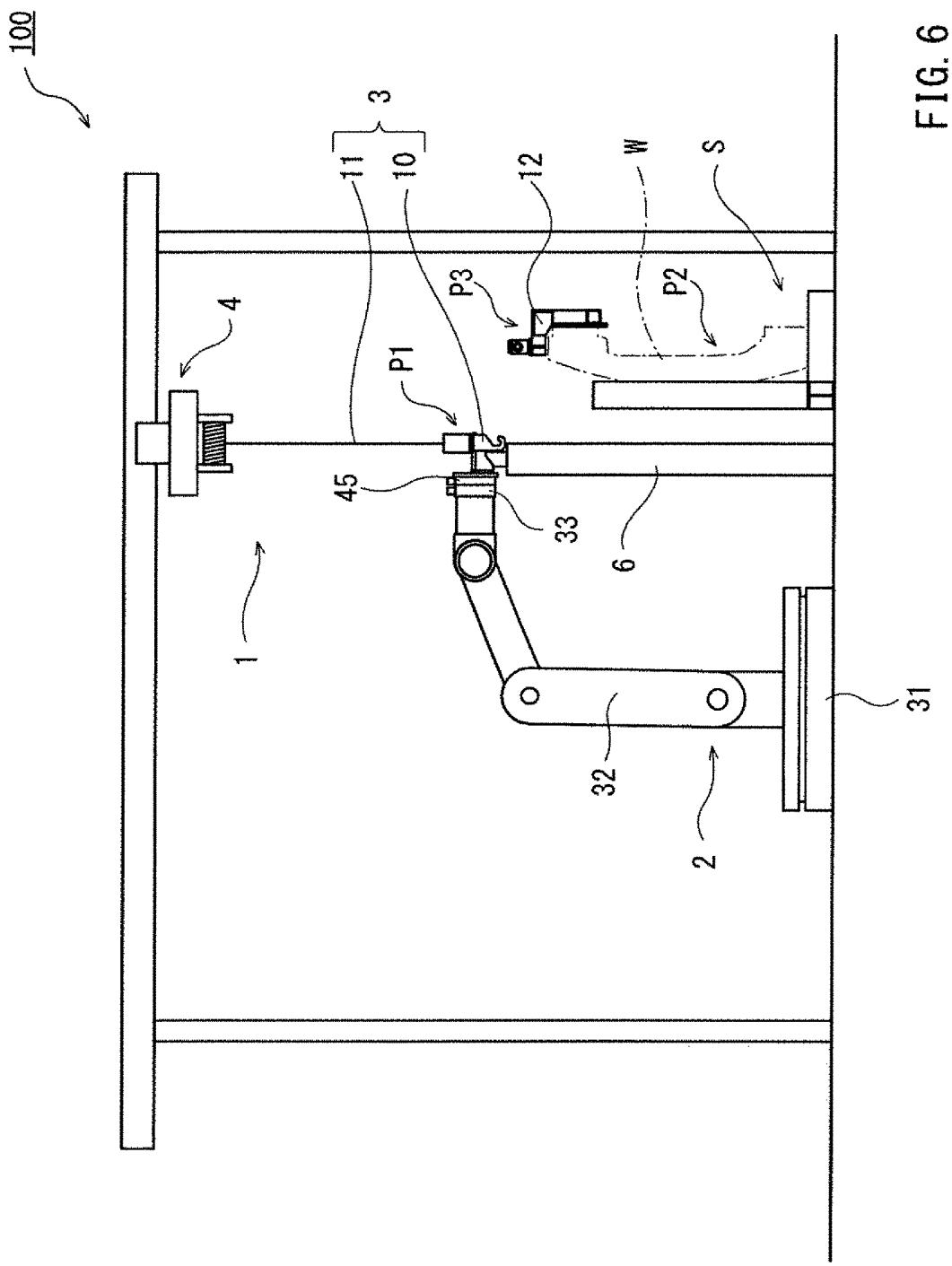
FIG. 6 is a view illustrating one example of operation of the automatic object conveying system of FIG. 1.
Figure 7:
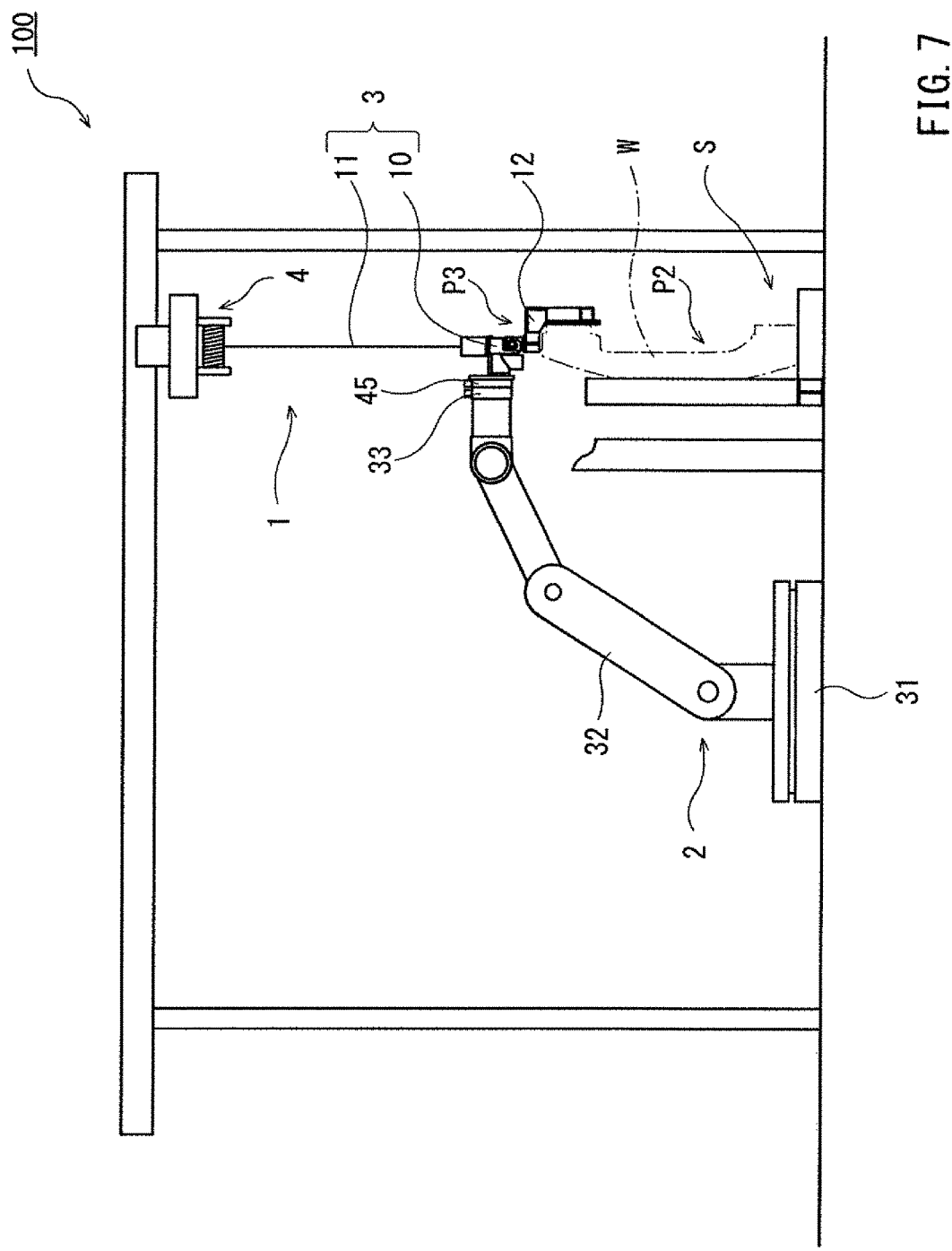
FIG. 7 is a view illustrating one example of the operation of the automatic object conveying system of FIG. 1.

FIGS. 6 and 7 are views illustrating the example of the operation of the automatic object conveying system 100 in this embodiment of the present disclosure.

First, as illustrated in FIG. 1, the coupler 10 of the suspender 3 is placed on the coupler placing table 6. Thereby, the coupler placing table 6 is located at the first position P1.

Next, the workpiece W is placed on the workpiece yard. Thereby, the workpiece W is placed at the second position, and the interface 12 attached to the workpiece W is located at the third position P3.

Next, as illustrated in FIG. 6, after the robot controller reads the first position P1 from the robot memory, it drives to arm 32 to move the robot-arm-side connection maintaining part 33 to the first position P1. Thereby, the robot-arm-side connection maintaining part 33 is connected to the coupler-side connection maintaining part 45. Note that, at this time, the robot controller controls the actuator of the trolley 24 to locate the trolley 24 above the first position P1, and further controls the actuator of the winch 23 to adjust the length of the wire rope 11 which is drawn from the winch 23.

Next, the robot controller drives the connection actuator to connect the robot-arm-side connection maintaining part 33 to the coupler-side connection maintaining part 45. Thereby, the coupler 10 is held by the arm 32 of the robot 2.

Next, as illustrated in FIG. 7, after reading the third position P3 from the robot memory, the robot controller drives the arm 32, moves the coupler 10 held on the arm 32 of the robot 2 arm 32 to the third position P3, and is hooked on the interface 12 to which the coupler 10 of the suspender 3 is attached by workpiece W. In addition, at this time, the robot controller controls the actuator of the trolley 24, locates the trolley 24 above the third position P3, further controls the actuator of the winch 23, and adjusts the length of the wire rope 11 which is drawn from the winch 23.

Next, the robot controller locates the pressing parts 43 at the deployed position Pb. Thereby, an upward movement (a direction toward the openings 53) of the coupler attachment parts 65 is regulated. When the pressing parts 43 is located at the deployed position Pb, the small diameter parts 43b of the pressing parts 43 fit into the fitting parts 61, and the relative spatial relationship and posture of the coupler 10 and the interface 12 are fixed, as described above. Thus, the coupler 10 is coupled to the interface 12 located at the third position P3, and the coupler 10 is coupled to the workpiece W located at the second position P2.

Next, the robot controller drives the connection actuator to detach the robot-arm-side connection maintaining part 33 from the coupler-side connection maintaining part 45.

Next, the suspending moving device 1 causes the moving mechanism 4 to convey the workpiece W coupled to the coupler 10, together with the suspender 3. Thus, the conveyance of the workpiece W is able to be performed automatically.

As described above, in the automatic object conveying system 100 of the present disclosure, the coupler 10 of the suspender 3 is placed on the coupler placing table 6 and is located at the known first position P1. Therefore, the robot controller acquires the position of the coupler 10 of the suspender 3 by reading the first position P1 from the robot memory, and the robot-arm-side connection maintaining part 33 of the robot 2 is connected to the coupler-side connection maintaining part 45 of the coupler 10 and, thus, the coupler 10 is able to be held by the robot 2.

In the automatic object conveying system 100, the interface 12 attached to the workpiece W located at the second position P2 is located at the third position P3. Therefore, the robot controller acquires the position of the interface 12, and the position of the work W located at the second position P2 which has the given spatial relationship with the third position P3, by reading the third position P3 from the robot memory, and the coupler 10 is mounted to the interface 12 located at the third position P3, and the suspender 3 is able to be coupled to the work W located at the second position P2. Thereby, the coupling of the workpiece W with the moving mechanism 4 is automated.

<Modifications>

In the embodiment described above, although the arm 32 is, but not limited to be, structured so as to hold the coupler 10 by coupling the robot-arm-side connection maintaining part 33 to the suspending-member-side connection maintaining part 45. Alternatively, for example, a hand having a gripping mechanism which grips an object may be provided to the tip-end of the arm 32, and the hand may grip the coupler 10 to hold the coupler 10.

Moreover, in the embodiment described above, the coupler 10 is, but not limited to be, structured to be coupled to the workpiece W by coupling the coupler 10 to the interface 12. Alternatively, for example, the coupler 10 may be coupled to the workpiece W by the coupler 10 attracting the workpiece W with a magnet. Alternatively, the coupler 10 may be coupled to the workpiece W by the coupler 10 sucking the workpiece W with a vacuum suction device.

Furthermore, in the embodiment described above, the robot 2 is, but not limited to be, structured so as to hold the coupler 10 by coupling the robot-arm-side connection maintaining part 33 to the coupler-side connection maintaining part 45. Alternatively, a hand which grips the coupler 10 may be provided at the tip-end of the arm 32 of the robot 2, and the hand may grip the coupler 10 to hold the coupler 10, move the coupler 10, and mount it to the interface 12.

Moreover, in the embodiment described above, the channel of the air supplied to the pressing part actuators 44 is, but not limited to be, structured so as to pass through the robot-arm-side connection maintaining part 33 and the coupler-side connection maintaining part 45. Alternatively, the channel of the air supplied to the pressing part actuators 44 may be structured to extend from the robot 2 to the pressing part actuators 44 through the suspending moving device 1.

Furthermore, in this embodiment, the pressing part actuators 44 is, but not limited to, the air cylinder. Alternatively, for example, it may be comprised of a motor or a hydraulic cylinder.

It is apparent from the above description for a person skilled in the art that many improvements and other embodiments of the present disclosure are possible. Therefore, the above description is to be interpreted only as illustration, and provided in order to teach a person skilled in the art the best mode which implements the present disclosure. Details of the structures and/or functions are/is substantially changeable without departing from the spirit of the present disclosure.

DESCRIPTION OF REFERENCE CHARACTERS

P1 First Position
P2 Second Position
P3 Third Position
Pa Retracted Position
Pb Deployed Position
W Workpiece
1 Suspending Moving Device
2 Robot
3 Suspender
4 Moving Mechanism
6 Suspending Member Placing Table
10 Coupler
11 Wire Rope
12 Interface
13 Crane Hook
23 Winch
24 Trolley
25 Traveling Rail
31 Robot Base
32 Arm
33 Robot-arm-aide Connection Maintaining Part
41 Base Part
42 Suspension Maintaining Part
43 Pressing Part
44 Pressing Part Actuator
45 Coupler-side Connection Maintaining Part
51 Coupling Ring
52 Base Part Main Body
53 Opening
54 Engaging Part
61 Fitting Part
62 Support Frame
63 Holding Shaft
64 Stationary Part
65 Coupler Attachment Part
66 Stop
100 Automatic Object Conveying System

What is claimed is:

1. An automatic object conveying system, comprising:
a robot having an arm configured to hold an object; and
a suspending moving device including a suspender and a moving mechanism configured to move the suspender, the suspender including a coupler to be coupled to the object and a suspending member configured to suspend the coupler, the coupler comprising:
a base part coupled to a tip-end part of the suspending member;
a suspension maintaining part attached to the base part and formed in a hook shape having an opening, the suspension maintaining part being configured to hook an interface attached to the object, the interface being configured to be couplable to the coupler;
a connection maintaining part attached to the base part and held by the arm of the robot;
a plurality of pressing parts configured to move between a retracted position and a deployed position that is relatively moved from the retracted position downwardly with respect to the base part, the plurality of pressing parts being provided at mutually different locations when seen in a vertical direction; and
a pressing part actuator configured to be controlled by the robot to move the plurality of pressing parts between the retracted position and the deployed position, wherein
the robot holds the coupler located at a given first position, and couples the held coupler to the object located at a given second position,
the robot is configured to couple the held coupler to the object located at the second position by holding the coupler located at the first position and coupling the held coupler to the interface attached to the object,
the suspending moving device is configured to move, by the moving mechanism, the object coupled to the coupler together with the suspender,
the interface includes a plurality of fitting parts configured to fit to the plurality of pressing parts located at the deployed position, respectively, and
the pressing part actuator locates the pressing parts at the deployed position to regulate a movement of the coupler hooked on the suspension maintaining part toward the opening of the suspension maintaining part.

2. The automatic object conveying system of claim 1, wherein the interface is held between the pressing parts located at the deployed position and the suspension maintaining part.

* * * * *